United States Patent
Kitahara

(10) Patent No.: US 8,701,133 B2
(45) Date of Patent: *Apr. 15, 2014

(54) OPTICAL INFORMATION RECORDING MEDIUM AND METHOD FOR MANUFACTURING SAME

(71) Applicant: Fujifilm Corporation, Tokyo (JP)

(72) Inventor: Toshiyuki Kitahara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/734,657

(22) Filed: Jan. 4, 2013

(65) Prior Publication Data

US 2013/0121127 A1 May 16, 2013

Related U.S. Application Data

(63) Continuation of application No. PCT/JP2011/064675, filed on Jun. 27, 2011.

(30) Foreign Application Priority Data

Jul. 13, 2010 (JP) ................................ 2010-158583

(51) Int. Cl.
*G11B 7/24* (2013.01)

(52) U.S. Cl.
USPC .............................. 720/718; 369/94; 428/64.8

(58) Field of Classification Search
None
See application file for complete search history.

(56) References Cited

U.S. PATENT DOCUMENTS

| | | | |
|---|---|---|---|
| 6,515,956 B2 | 2/2003 | Tamada | |
| 8,054,727 B2 | 11/2011 | Shiono | |
| 2002/0009037 A1 | 1/2002 | Tamada | |
| 2006/0072437 A1 | 4/2006 | Shiono et al. | |
| 2008/0020169 A1* | 1/2008 | Haubrich et al. | 428/64.6 |
| 2009/0075014 A1 | 3/2009 | Miki et al. | |
| 2009/0161502 A1 | 6/2009 | Shiono | |
| 2010/0309759 A1 | 12/2010 | Sato et al. | |
| 2011/0110208 A1 | 5/2011 | Yanagisawa | |
| 2011/0149711 A1 | 6/2011 | Yanagisawa | |

FOREIGN PATENT DOCUMENTS

| | | |
|---|---|---|
| JP | 2001-325745 A | 11/2001 |
| JP | 2008-71441 A | 3/2008 |
| JP | 2009-87522 A | 4/2009 |
| JP | 4290650 B2 | 7/2009 |

(Continued)

OTHER PUBLICATIONS

Kawata, "Three-dimensional Optical Memory using a Femto-second Laser", Optronics No. 11, p. 138-142, 2001.*

(Continued)

*Primary Examiner* — Brian Miller
*Assistant Examiner* — Brian Butcher
(74) *Attorney, Agent, or Firm* — Sughrue Mion, PLLC

(57) ABSTRACT

An optical information recording medium 10 comprises: a plurality of recording layers 14, each of which undergoes a change in a refractive index by irradiation with a recording beam; and at least one intermediate layer 15 provided between the plurality of recording layers 14. The recording layer 14 and the intermediate layer 15 have different refractive indices, and, among interfaces between the plurality of recording layers 14 and the at least one intermediate layer 15, a recording layer 14 and an intermediate layer 15 disposed adjacent to the recording layer 14 at an incident side from which the recording beam enters the recording layer 14 are merged with each other at an interface (near-side interface 19) therebetween, whereby a refractive index gradually changes at the interface.

9 Claims, 10 Drawing Sheets

(56) References Cited

FOREIGN PATENT DOCUMENTS

| JP | 2009-277271 A | 11/2009 |
|---|---|---|
| JP | 2010-86568 A | 4/2010 |
| WO | 2007/055249 A1 | 5/2007 |
| WO | 2009/037773 A1 | 3/2009 |
| WO | 2010/007665 A1 | 1/2010 |

OTHER PUBLICATIONS

Teruhiro Shiono, et al., "Two-Photon Absorption Recording in Photochromic Diarylethenes Using Laser Diode for Three-Dimensional Optical Memory", Japanese Journal of Applied Physics, May 24, 2005, pp. 3559-3563, vol. 44, No. 5B.

Teruhiro Shiono, "Two-Photon Absorption Recording in Photochromic Materials Using Laser Diode", Optronics, 2005, pp. 173-178, No. 7.

International Search Report for PCT/JP2011/064675 dated Aug. 30, 2011.

Written Opinion for PCT/JP2011/064675 dated Aug. 30, 2011.

* cited by examiner

DURING RECORDING

FIG. 8
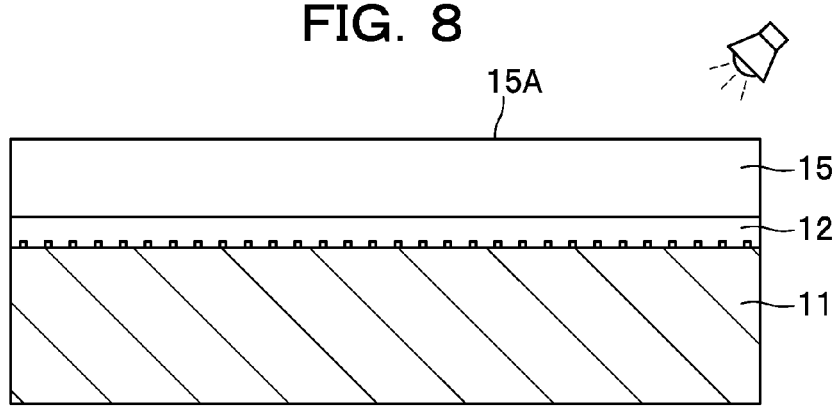
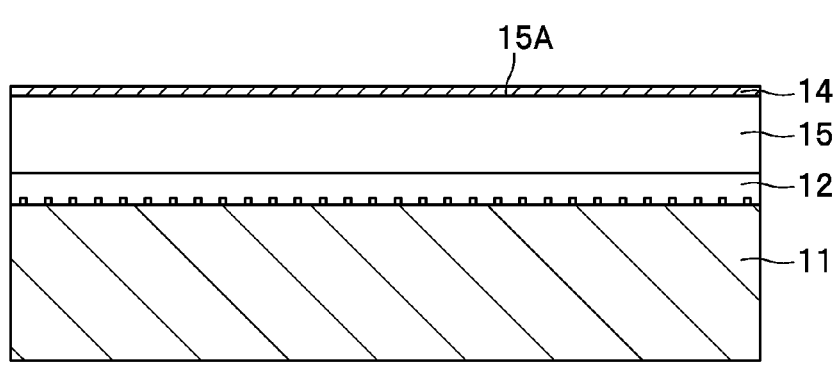
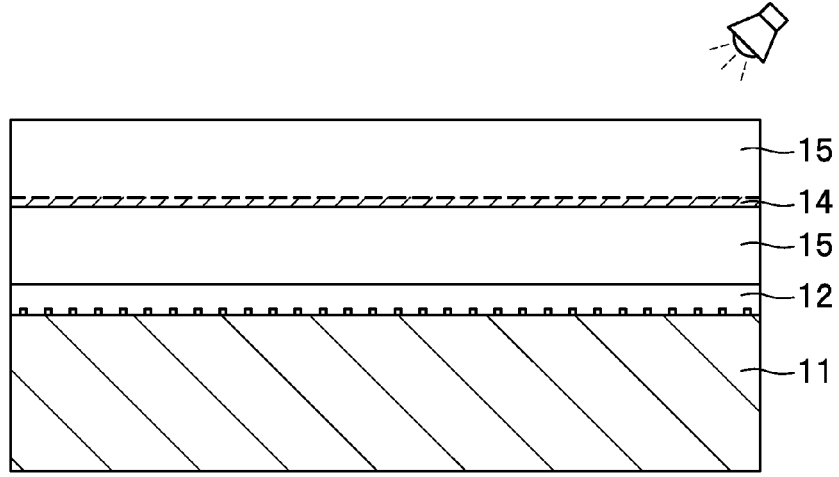

FIG. 9
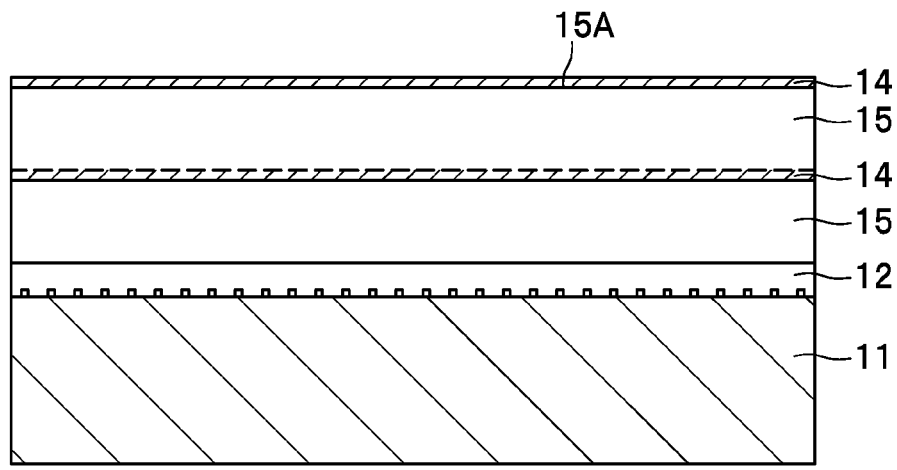
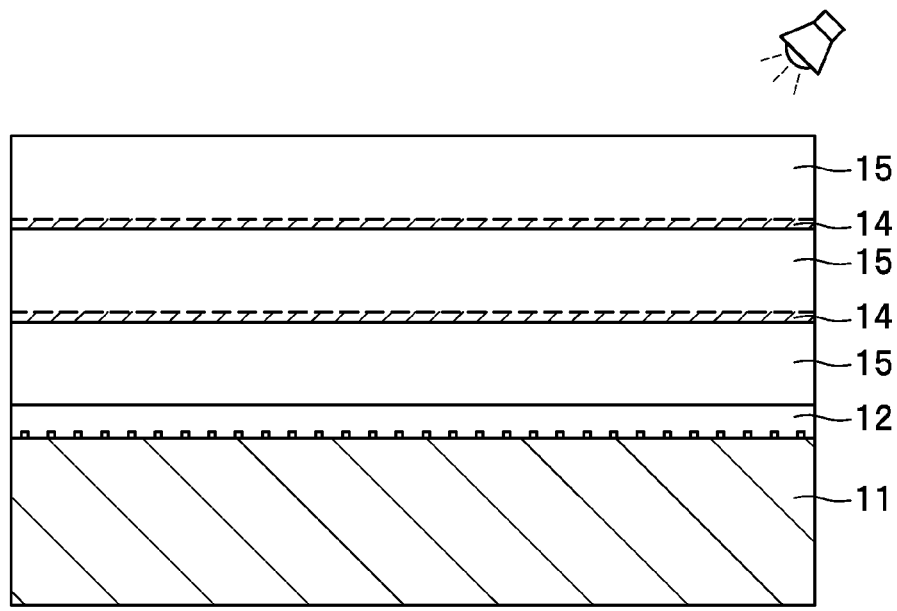

DURING READING

OPTICAL INFORMATION RECORDING MEDIUM AND METHOD FOR MANUFACTURING SAME

CROSS-REFERENCE TO RELATED APPLICATION(S)

This application is a continuation application of International Application No. PCT/JP2011/064675 filed on Jun. 27, 2011, which claims priority to Japanese Patent Application No. 2010-158583 filed on Jul. 13, 2010, the disclosures of which are incorporated herein by reference in their entity.

TECHNICAL FIELD

The present invention relates to an optical information recording medium and a method for manufacturing the same.

BACKGROUND ART

To record information in multiple layers of an optical information recording medium, in recent years, research has been made on a method for causing a recording material contained in the optical information recording medium to produce an optical change using a multi-photon absorption reaction such as two-photon absorption (see, for example, Patent Literature 1). Similar to a widely-used conventional optical information recording medium with a single recording layer, according to an optical information recording medium utilizing a multi-photon absorption reaction, a change in the refractive index of a recording material at a recording region and the thickness of the recording layer are determined, in consideration of the fact that reflected lights reflected at both upper and lower interfaces of the recording layer interfere with each other upon reading out the information (this is called interference effect), such that the difference between the reflectivity at a recorded portion and the reflectivity at a non-recorded portion (i.e., difference in the ratio of light beams which are reflected at the upper and lower interfaces of the recording layer and interfere with each other, and thereafter return to an optical pickup) is large. In an information recording medium disclosed in Patent Literature 1, consideration is made on the relationship between the film thickness and the reflectivity as shown in FIG. 2 of this literature, and the paragraph [0062] suggests that the thickness of the recording layer is preferably around $\lambda/4n$, where $\lambda$ is the wavelength of the readout beam, and n is the refractive index of the recording layer, or even thinner to have a thickness of around 5-50 nm.

Another optical information recording medium which does not utilize interference effect as utilized in above literature is disclosed in Patent Literature 2. According to this known optical information recording medium, a fluorescent-light emission layer is provided under the recording layer, and the light emitted by the fluorescent-light emission layer is detected through the recording layer to read out the information.

CITATION LIST

Patent Literature

Patent Literature 1: Japanese Patent No. 4290650
Patent Literature 2: Japanese laid-open patent application publication No. 2001-325745

SUMMARY OF THE INVENTION

Technical Problem

However, if the interference effect of the reflected lights reflected at both interfaces of the recording layer is utilized upon reading out the information as with Patent Literature 1, the recording layer must be produced to have so exact film thickness as designed to obtain an excellent degree of modulation. This requires the accuracy of the film thickness and thus leads to increased manufacturing cost of the optical information recording medium.

Further, if, as with Patent Literature 2, a fluorescent light emitted is regarded as a base light and the modulation is obtained from the variations of the light received by a light detector for detecting how much of the base light returns, it is difficult to obtain an acceptable reproduction output because the emitted fluorescent light is very weak.

In view of the above, the present invention seeks to provide an optical information recording medium and a method for manufacturing the optical information recording medium, which provides an excellent reproduction output without requiring highly-accurate film thickness of the recording layer.

Solution to Problem

In order to solve the aforementioned problems, the present invention provides an optical information recording medium comprising: a plurality of recording layers, each of which undergoes a change in a refractive index by irradiation with a recording beam; and at least one intermediate layer provided between the plurality of recording layers, wherein the recording layer and the intermediate layer have different refractive indices, and wherein among interfaces between the plurality of recording layers and the at least one intermediate layer, a recording layer and an intermediate layer disposed adjacent to the recording layer at an incident side from which the recording beam enters the recording layer are merged with each other at an interface therebetween, whereby a refractive index gradually changes at the interface.

According to this optical information recording medium, if the recording layer is irradiated with light and the recording layer undergoes a change in refractive index to have a lens effect as described later, as seen from a direction from which the reading beam enters the recording layer upon reading out the information, a reading beam (light irradiated for reading out information) is reflected at an interface between the recording layer and an adjacent intermediate layer disposed at a far side of the recording layer (this interface is referred to as a "far-side interface" in this specification), but the recording beam is not reflected at an interface between the recording layer and an adjacent intermediate layer disposed at a near side of the recording layer (this interface is referred to as a "near-side interface" in this specification). Therefore, the reflection at the near-side interface does not disturb detection of the reflected light at the far-side interface, with the result that the information is regenerated with a high signal-to-noise ratio.

In the aforementioned optical information recording medium, the recording layers may be made of resin which contains dye, and the at least one intermediate layer may be made of resin which is transparent to the recording beam.

Further, the aforementioned optical information recording medium is preferably configured to satisfy $0.001<((n2-n1)/(n2+n1))^2<0.04$, where n1 is a refractive index of the recording layer, and n2 is a refractive index of the intermediate layer.

As $((n2-n1)/(n2+n1))^2$, namely reflectivity, is greater than 0.001, the intensity of the reflected light at the far-side interface is sufficiently ensured so as to enable reading of the information. Whereas, as the reflectivity is smaller than 0.04, the intensity of the reflected light at the far-side interface is appropriately small so that the recording beam and the reading beam can reach far deeper recording layers, thereby allowing a large number of recording layers to be provided to achieve high capacity recording.

In the optical information recording medium according to the present invention, since substantially no reflection occurs at the near-side interface, if the reflectivity determined by taking into account the reflection at the near-side interface and the reflection at the far-side interface should be constant, the reflectivity at the far-side interface can be set to a greater value as compared to a medium in which reflection occurs at the near-side interface. This ensures higher signal-to-noise ratio upon reading out information.

A method for manufacturing the aforementioned optical information recording medium comprises: a first step of applying a material for the recording layer to a recording layer forming surface; a second step of applying a material for the intermediate layer before curing the material for the recording layer or after partially curing the material for the recording layer; and a third step of curing the material for the recording layer and the material for the intermediate layer, wherein the first step to the third step are repeatedly carried out.

Applying a material for the intermediate layer before curing the recording layer or after partially curing the recording layer causes the material for the recording layer and the material for the intermediate layer to be dispersed and slightly merged with each other. Thereafter, the recording layer and the intermediate layer having been merged in this way are cured simultaneously, so that an optical information recording medium, in which the recording layer and the intermediate layer are merged with each other at the near-side interface, can be manufactured. Since the first step to the third step are repeatedly carried out after completing the third step, a recording layer is applied on top of the intermediate layer having already been cured, so that the intermediate layer and the recording layer are not merged at the far-side interface and a clearly separated interface is formed therebetween. Accordingly, reflection occurs at the far-side interface.

In the aforementioned manufacturing method, application of the material for the recording layer and application of the material for the intermediate layer may be carried out by spin coating.

In the aforementioned manufacturing method, the material for the intermediate layer may contain light curing resin, and the material for the intermediate layer may be cured in the third step by irradiation with light.

Other aspects and advantages of the present invention will become apparent from the following detailed description taken in conjunction with the accompanying drawings.

BRIEF DESCRIPTION OF THE DRAWINGS

FIG. 8 is an explanatory view showing a manufacturing method for an optical information recording medium, which includes steps (a) to (c);

FIG. 9 is an explanatory view showing a manufacturing method for an optical information recording medium, which includes steps (a) and (b)

DESCRIPTION OF EMBODIMENTS

One exemplified embodiment of the present invention will be described below with reference to the drawings.

Figure 1:
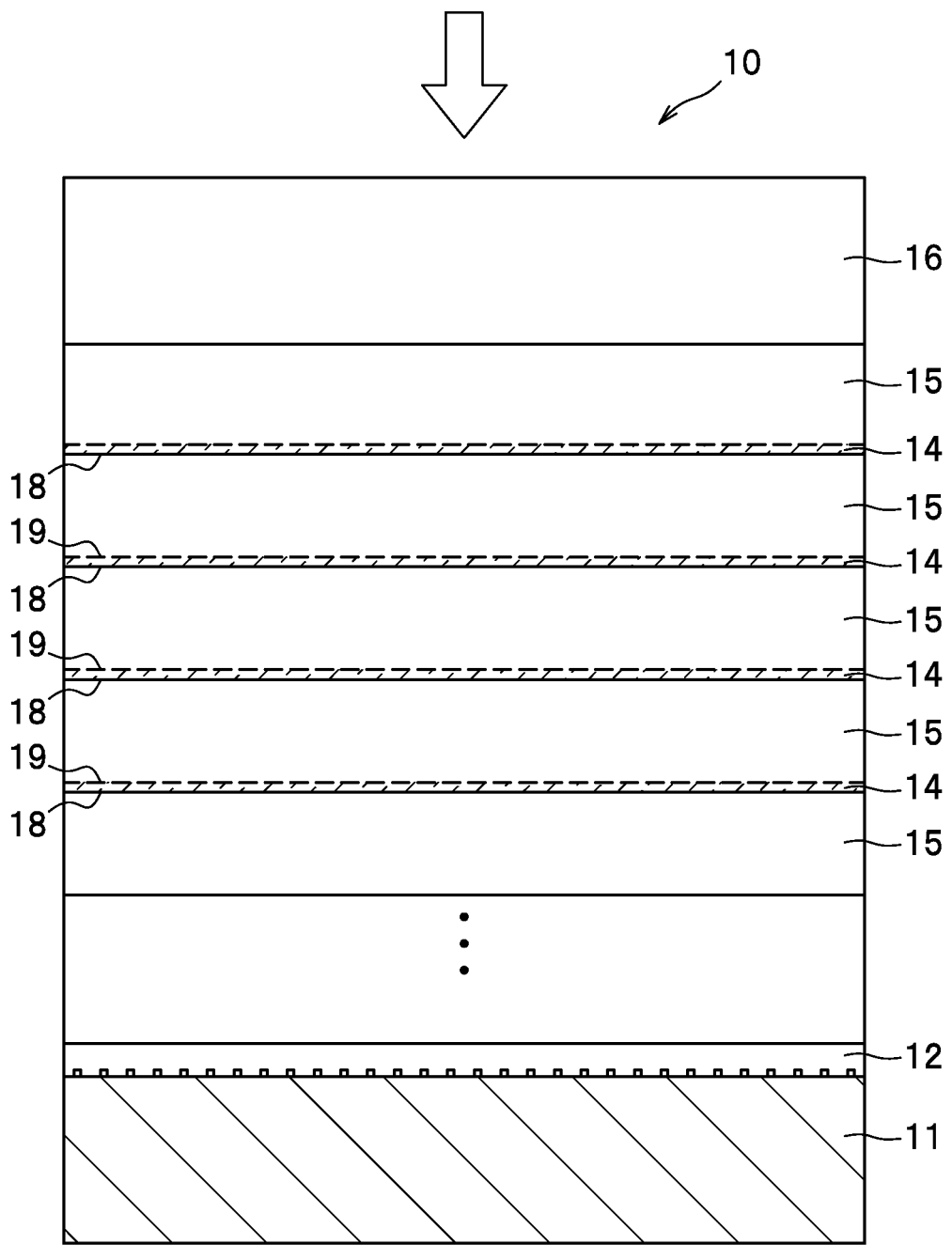
FIG. 1 is a sectional view of a multi-layered optical information recording medium.

As seen in FIG. 1, an optical information recording medium 10 according to one embodiment of the present invention comprises a substrate 11, a servo signal layer 12, a plurality of recording layers 14, a plurality of intermediate layers 15, and a cover layer 16.

The substrate 11 is a support member for supporting the recording layers 14 and other layers. As an example, the substrate 11 is a circular plate made of polycarbonate. The material and the thickness of the substrate 11 are not specifically limited.

The servo signal layer 12 is made of a tacky or adhesive resinous material and configured to retain the recording layers 14 and the intermediate layers 15 on the substrate 11. A servo signal is previously recorded in the servo signal layer 12 at a surface close to the substrate 11; the servo signal is recorded as an irregular pattern or by utilizing the change in the refractive index. Herein, the servo signal is a previously set signal for assisting a recording and reading apparatus 1 to recognize the servo signal layer 12 as a focus reference surface during recording and reading out the information. To bring the focus on a predetermined recording layer 14, focus control is performed taking into account the distance from the reference surface and the number of interfaces. Further, to accurately irradiate the track of the circumferentially arranged recording spots with a laser beam at the time of recording and reading out the information, it is preferable that a tracking servo signal or a groove for tracking is previously provided. It is to be noted that the presence or absence of the servo signal layer 12 may be optional.

The recording layer 14 is made of a photosensitive material on which information is optically recordable. Irradiating the recording layer 14 with a recording beam (irradiated light for recording) causes the recording layer 14 to undergo a change in the refractive index. Change in the refractive index caused by irradiation of the recording beam may be an increase from a lower state to a higher state or alternatively a decrease from a higher state to a lower state. As an example in this embodiment, a recording material which undergoes a change in the refractive index from a higher state to a lower state is used in the recording layer 14. In order to provide the recording layer 14 having an appropriate thickness and to change the refractive index of the recording layer using the heat generated as a result of dye absorbing light, it is preferable that the material for the recording layer 14 is, for example, resin which contains dye for allowing one-photon absorption or multi-photon absorption of the recording beam. The resin containing the dye may be prepared, for example, by dispersing the dye in a polymer binder. Specific examples of the polymer binder may include polyvinyl acetate (PVAc), polymethylmethacrylate (PMMA), polycarbonate (PC), polystyrene (PS), and polyvinyl alcohol (PVA). Further, the binder may contain light curing resin (UV curable resin) which is cured by irradiation with light.

Examples of the recording beam-absorbing dye may include dyes which have been conventionally used as a thermally deformable heat mode type recording material. For example, a phthalocyanine-based compound, an azo compound, an azo metal complex compound, and methine dyes (e.g., a cyanine-based compound, an oxonol-based compound, a styryl dye, and a merocyanine dye) may be used as the recording beam-absorbing dye. Further, to minimize adverse effects on adjacent recording layers during recording on and reading from the recording medium having a multi-layered recording layers, it is preferable that a multi-photon absorption dye is used as the recording beam-absorbing dye. As an example of the multi-photon-absorption dye, a two-photon absorption compound without having a linear absorption band at the wavelength of a reading beam is preferable.

As long as the two-photon absorption compound does not have a linear absorption band at the wavelength of the reading beam, any known two-photon absorption compound may be used; for example, compounds having a structure represented by the following formula (1) may be used.

[Chem. 1]

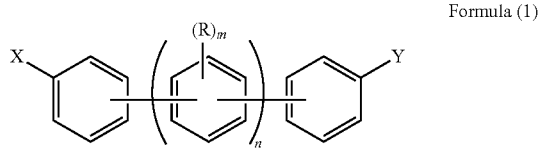

Formula (1)

In Formula (1), each of X and Y may represent a substituent having a Hammett's sigma para-value (σp value) of 0 or more, which may be the same with or different from each other; n represents an integer of 1 to 4; R represents a substituent, and a plurality of Rs may be the same with or different from each other; and m represents an integer of 0 to 4.

In Formula (1), each of X and Y represents a group having a σp value taking a positive value in Hammett equation, i.e., what is called an electron-withdrawing group, preferably, e.g., a trifluoromethyl group, a heterocyclic group, a halogen atom, a cyano group, a nitro group, an alkylsulfonyl group, an arylsulfonyl group, a sulfamoyl group, a carbamoyl group, an acyl group, an acyloxy group, an alkoxycarbonyl group and the like, more preferably a trifluoromethyl group, a cyano group, an acyl group, an acyloxy group, and an alkoxycarbonyl group, and most preferably a cyano group and a benzoyl group. Of these substituents, an alkylsulfonyl group, an arylsulfonyl group, a sulfamoyl group, a carbamoyl group, an acyl group, an acyloxy group and an alkoxycarbonyl group may further have a substituent for various purposes including giving solubility in a solvent. The examples of the substituents include an alkyl group, an alkoxy group, an alkoxyalkyl group, an aryloxy group, etc.

n represents an integer of 1 or more and 4 or less, preferably 2 or 3, and most preferably 2. If n is 5 or more, it is said that the greater n becomes, the more the linear absorption appears at the longer wavelength side, so that non-resonant two-photon absorption recording is not done with a recording beam at a wavelength band shorter than 700 nm.

R represents a substituent. The substituent is not specifically limited, and an alkyl group, an alkoxy group, an alkoxyalkyl group, and an aryloxy group are exemplified as specific examples. m represents an integer of 0 or more and 4 or less.

The compound having the structure represented by Formula (1) is not specifically limited; for example, compounds represented by the following chemical structural formulae D-1 to D-21 may be used.

[Chem. 2]

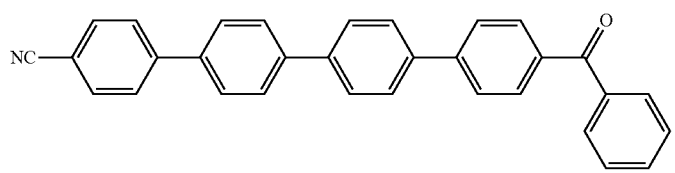

D-1

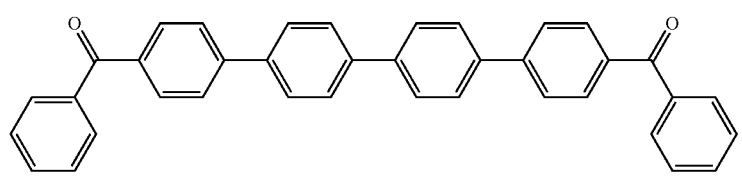

D-2

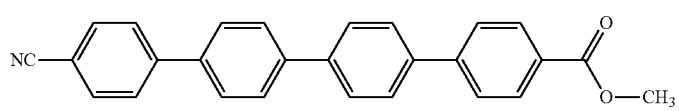

D-3

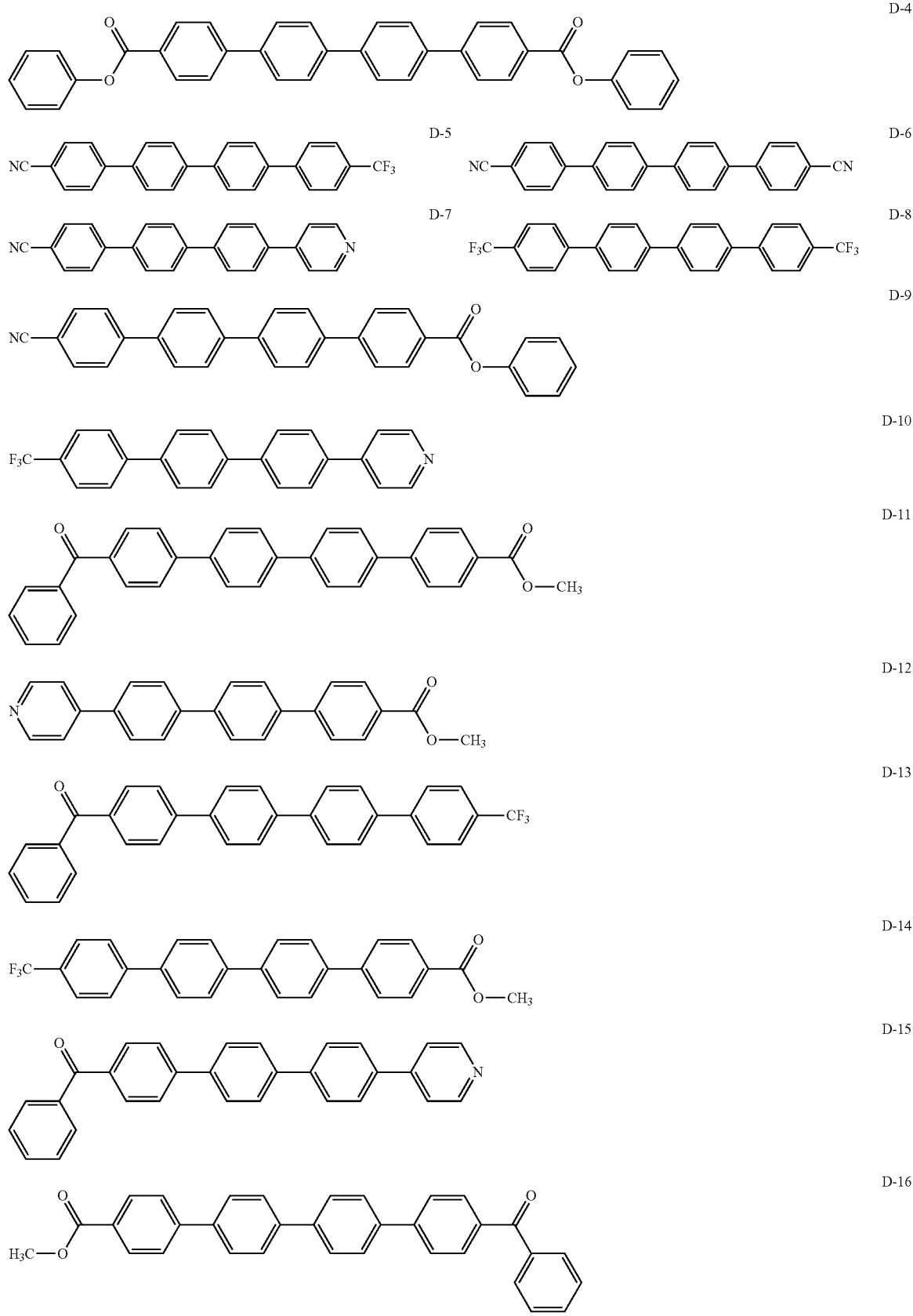

-continued

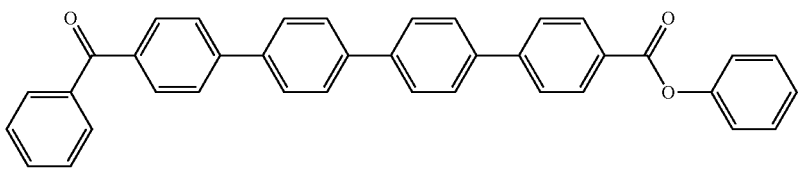

D-17

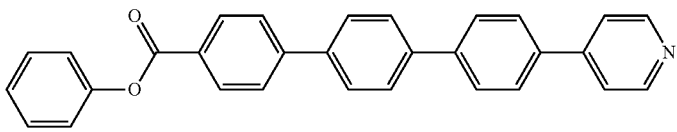

D-18

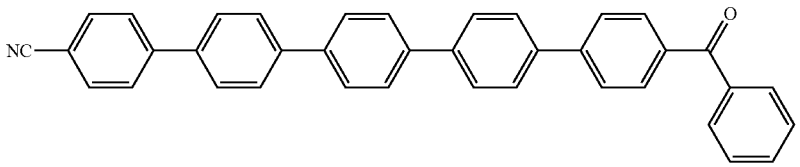

D-19

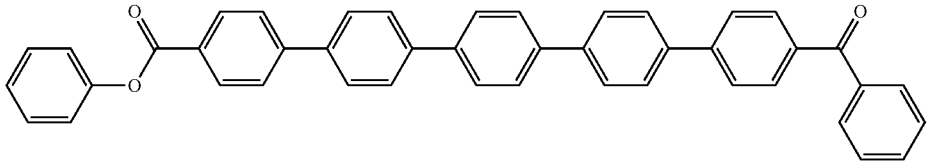

D-20

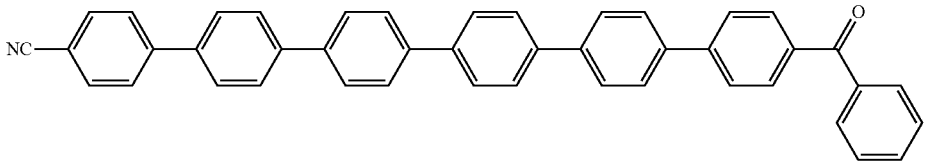

D-21

Figure 2:
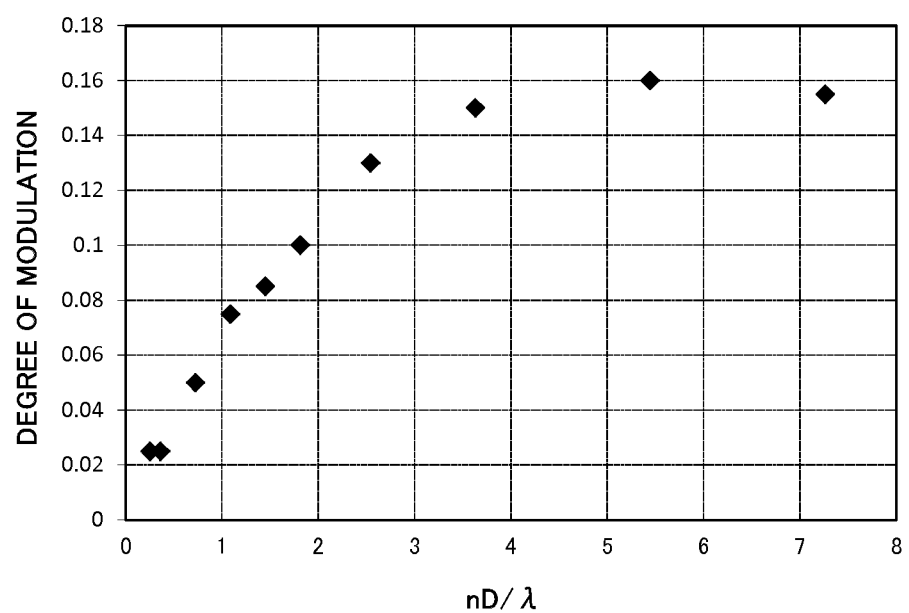
FIG. 2 is a graph showing the relationship between thickness of the recording layer and degree of modulation.

The recording layer 14 has a sufficient thickness so that the distribution of the refractive index to be formed after recording achieve a lens effect. To be more specific, the recording layer 14 has a thickness equal to or greater than $2\lambda/n$, where $\lambda$ is the wavelength of the recording beam and n is the refractive index of the recording layer 14. As seen in FIG. 2, when calculating the relationship between $nD/\lambda$ (where D is the thickness of the recording layer) and degree of modulation (i.e., value obtained from the intensity of the detected light by (Maximum value−Minimum value)/Maximum value), if $nD/\lambda$ is equal to or greater than 2, the degree of modulation is 0.1 or more, and it is thus shown that an excellent degree of modulation is achieved. This reveals that the thickness D is preferably equal to or greater than $2\lambda/n$.

As an example, if the wavelength of the recording beam is 522 nm and the refractive index of the recording layer 14 is 1.40, the thickness of the recording layer 14 should be 745 nm or more. This thickness is several-fold thicker than that of the conventional optical information recording medium utilizing interference effect. Accordingly, when a recording spot is formed in the recording layer 14, the recording spot has a lens effect.

Although the thickness of the recording layer 14 does not have an upper limit, it is preferable that the thickness thereof is equal to or smaller than 5 μm in order to increase the number of recording layers 14 to as many as possible. In this embodiment, as an example, the thickness of the recording layer 14 is 1 μm. The number of recording layers 14 provided is, for example, approximately from 2-100 layers. To increase the storage capacity of the optical information recording medium 10, a large number of recording layers 14, for example, 10 or more recording layers 14 are preferable.

As seen in FIG. 1, each recording layer 14 is interposed between intermediate layers 15, namely, the intermediate layers 15 are disposed at upper and lower sides of each recording layer 14. Each intermediate layer 15 is made of a material which is unreactive to irradiation of the laser beam at the time of recording and reading out the information. In order to minimize the loss of the recording beam at the time of recording, it is preferable that the intermediate layer 15 is made of resin which is transparent to the recording beam. Herein, the term "transparent" indicates that the absorption ratio is equal to or less than 1%. As an example, the intermediate layer 15 may contain light curing resin (UV curable resin) which is curable by irradiation with light. In order to prevent crosstalk across a plurality of recording layers 14 (i.e., phenomenon by which a signal from one recording layer 14 is mixed with another signal from an adjacent recording layer 14), the intermediate layer 15 is provided to form a predetermined amount of space between the adjacent recording layers 14. For this purpose, the thickness of the intermediate layer 15 is equal to or more than 3 μm. As an example, the intermediate layer 15 is 10 μm thick in this embodiment.

To enable reflection of the reading beam, among interfaces between a recording layer 14 and intermediate layers 15 adjacent to the recording layer 14, at a far-side interface 18 between the recording layer 14 and a far-side intermediate layer 15 disposed at a far-side of the recording layer 14 as seen from a direction from which the recording beam enters the recording layer 14 (i.e., from upper side of FIG. 1), it is preferable that the refractive index of the intermediate layer 15 be different to some appropriate degree from that of the recording layer 14. To be more specific, it is preferable that the following relation is satisfied:

$$0.001 < ((n2-n1)/(n2+n1))^2 < 0.04$$

where n1 is a refractive index of the recording layer 14, and n2 is a refractive index of the intermediate layer 15.

If $((n2-n1)/(n2+n1))^2$ is greater than 0.001, the quantity of the reflected light at the far-side interface 18 is large, so that a high signal-to-noise ratio is obtained at the time of reading the information. Whereas, if $((n2-n1)/(n2+n1))^2$ is smaller than 0.04, the quantity of the reflected light at the far-side interface 18 is restricted to an appropriately small degree, so that a record/readout beam (i.e., beam including a recording beam, a reading beam, and a readout beam in this specification) can reach far deeper recording layers 14 without considerable attenuation of the record/readout beam upon recording and reading out the information.

As an example, the refractive index n2 of the intermediate layer 15 is 1.61. If the refractive index n1 of the recording layer 14 is 1.40, $((n2-n1)/(n2+n1))^2$ is 0.0049 and the aforementioned inequality expression is satisfied.

Among interfaces between a recording layer 14 and intermediate layers 15 adjacent to the recording layer 14, the recording layer 14 and the intermediate layer 15 which is adjacent to the recording layer 14 at an incident side from which the recording beam enters the recording layer 14 are merged with each other at an interface (near-side interface 19) therebetween, whereby the refractive index gradually changes at the interface. Namely, the interface is not clearly formed. Accordingly, reflection derived from an abrupt change in the refractive index does not occur at the near-side interface 19, and the record/readout beam is allowed to pass through the near-side interface 19 without reflection. In the drawings, interfaces between adjacent layers, at which materials for the adjacent layers are merged with each other, are shown by broken lines for descriptive purposes.

It is important that the recording layer 14 and the intermediate layer 15 are merged with each other at the near-side interface 19 so that the reflectivity at the near-side interface 19 is sufficiently smaller than that at the far-side interface 18. If the reflected light from the near-side interface 19 and the reflected light from the far-side interface 18 interfere with each other, the reproduction output would be higher or lower in accordance with a change in the thickness of the recording layer 14. Such variation in the reproduction output does not afford even an extremely small error (e.g., a fraction of the wavelength of the readout beam or less) in the thickness of the recording layer 14. It is therefore very difficult to manufacture an actual medium such that recording layers 14 having, for example, 1 μm thick are accurately and uniformly formed so as not to cause any variation in the reproduction output as described above. From this point of view too, since the reflectivity at the near-side interface 19 is sufficiently smaller than that at the far-side interface 18, it is possible to readily manufacture the optical information recording medium 10 and to maintain stable quality of the optical information recording medium 10.

The cover layer 16 is provided to protect the recording layers 14 and the intermediate layers 15. The cover layer 16 is made of a material which allows the record/readout beam to pass through the cover layer 16. The cover layer 16 has an appropriate thickness in the range from several tens micro meters to several millimeters.

Description will be given of the method for recording information on and reading out the information from the optical information recording medium 10 as described above.

Figure 3:
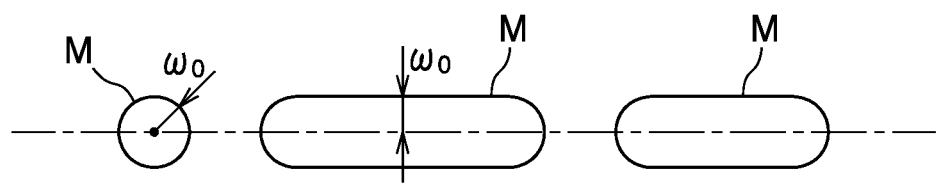
FIG. 3 is a top view of recording spots.
Figure 5:
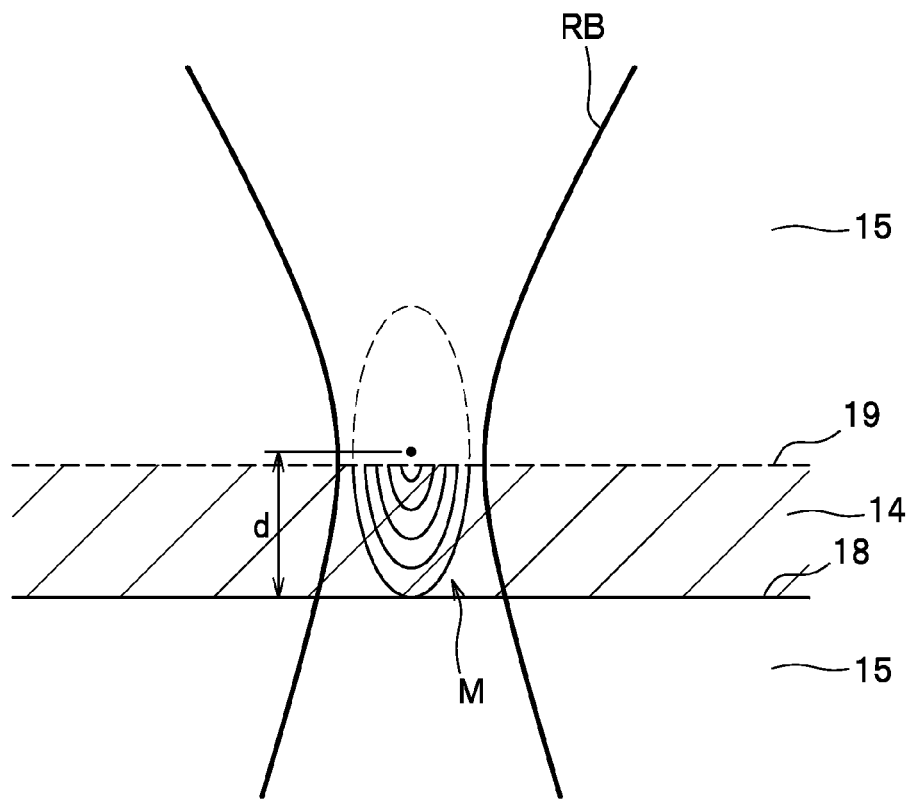
FIG. 5 is an explanatory view showing a focal position at the time of recording information and formation of a recording spot.

For recording information in a desired recording layer 14, the recording layer 14 is irradiated with a laser beam (recording beam RB) output of which is modulated in accordance with the information to be recorded. If the recording layer 14 contains a multi-photon absorption compound as a main recording dye, it is preferable that the laser beam used for this recording may be a pulsed laser beam, the peak power of which can be increased. As seen in FIG. 5, it is preferable that a focal position of the recording beam RB is shifted by an offset amount d, which satisfies $\omega_0 < d < 3\omega_0$, from the far-side interface 18 toward the incident side of the recording beam RB. Herein, ω is the radius of the recording spots M shown in FIG. 3. As with the recording spot M shown in the left side of FIG. 3, the radius $\omega_0$ indicates the radius of a circular spot formed when the recording beam RB and the optical information recording medium 10 are not moved relatively to each other. If an elongated recording spot is obtained as a result of a relative movement between the recording beam RB and the optical information recording medium 10 as with the two recording spots M shown in the middle and the right side of FIG. 3, the radius $\omega_0$ is determined as a half of the width of the recording spot M.

Figure 4:
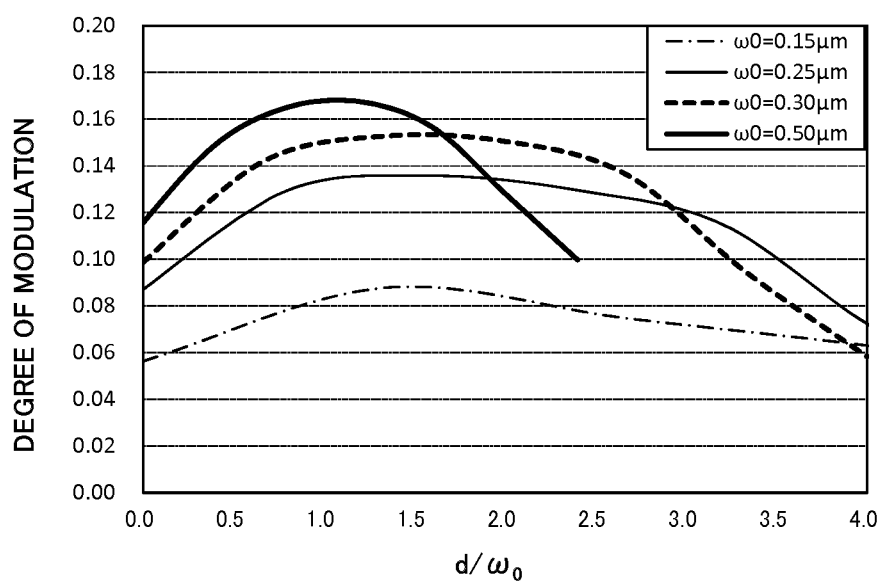
FIG. 4 is a graph showing the relationship between $d/\omega_0$ and degree of modulation.

Description will be given of the range of the offset amount d. First, the radius $\omega_0$ of a fine spot which can be formed by the laser beam is considered to be in the range of 0.1-0.3 μm. The radius $\omega_0$ of the spot to be recorded is determined from the diffraction limit which is determined by the wavelength of the recording beam used and the numerical aperture NA of the objective lens. It is preferable that the radius $\omega_0$ is approximately in the range of 0.1-0.3 μm taking into consideration the surface recording density per one recording layer 14 and the wavelength of the recording laser used. Calculating the relationship between the ratio $d/\omega_0$ of the offset amount d to the radius $\omega_0$ and the degree of modulation as shown in FIG. 4 reveals that better degree of modulation can be obtained if $\omega_0 = 0.15-0.3$ μm and the value of $d/\omega_0$ is in the range of 1-3. Therefore, it is said that better offset amount d is in the range of $\omega_0 < d < 3\omega_0$. In this calculation, the thickness of the recording layer 14 is 1 μm.

When the recording layer 14 is irradiated with the recording beam RB as described above, as schematically illustrated in FIG. 5, depending on the intensity of light, a light absorption reaction is induced more in the proximity of the focal point where the intensity of the light is strong (light is absorbed proportionally to the square of the intensity of the light in the case of the two-photon absorption reaction), at which position the refractive index is small in proportion to this reaction. For this reason, the distribution of the refractive index is formed in the recording layer 14 of 1 μm thick. The recording spot M with this distribution of the refractive index acts as a lens.

Figure 6:
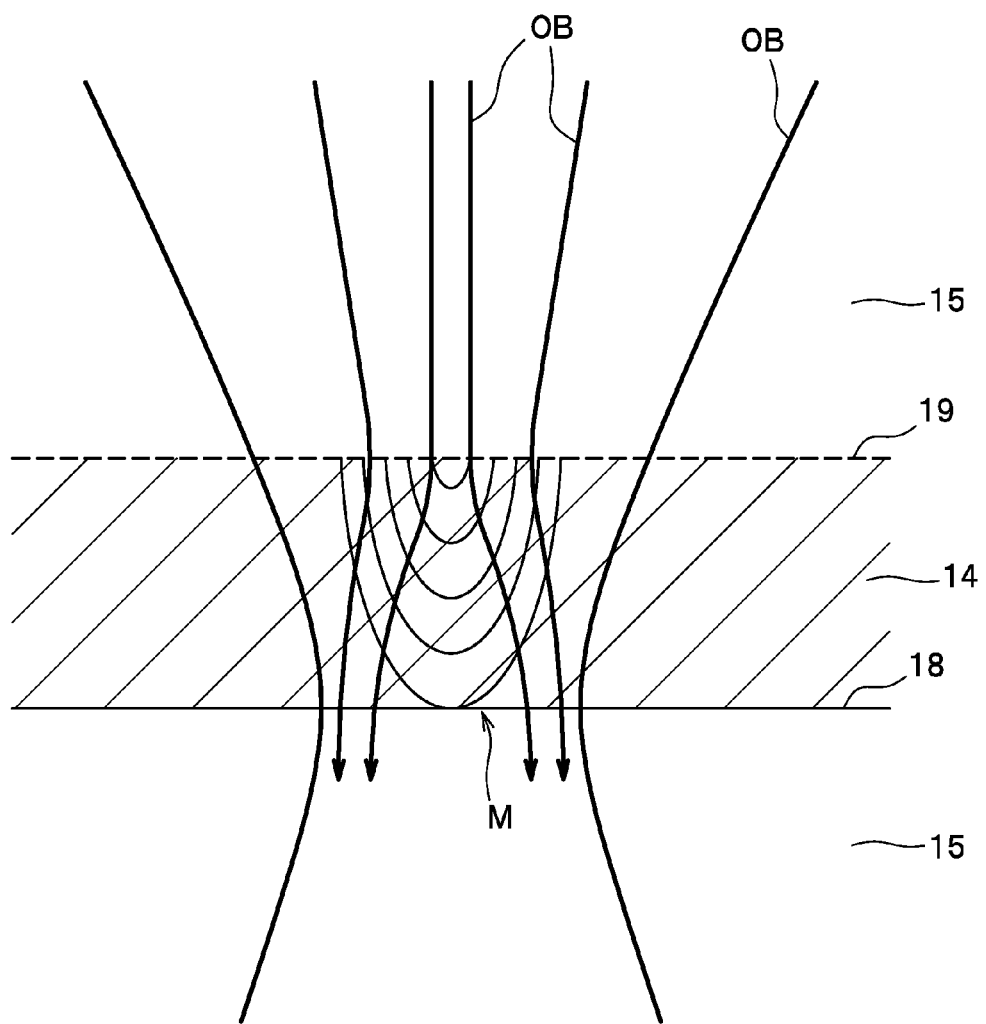
FIG. 6 is an explanatory view showing a focal position at the time of reading out the information and the lens effect at the recording spot.
Figure 7:
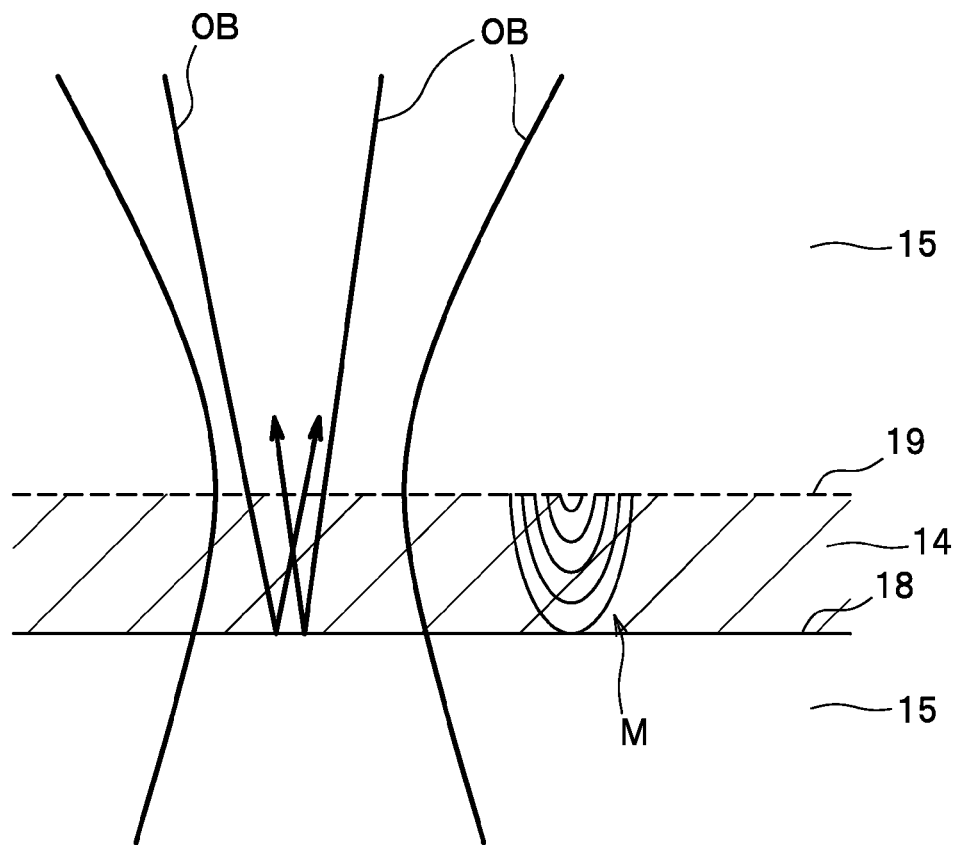
FIG. 7 is an explanatory view showing a focal position at the time of reading out the information and the reflection of the reading beam at a non-recorded position.

For reading out the information from a desired recording layer 14, the recording layer 14 is irradiated with a CW laser beam (reading beam OB). In this instance, as seen in FIG. 6, the focal position of the reading beam OB is adjusted with the far-side interface 18 between the recording layer 14 and the intermediate layer 15 set as a target. The reading beam OB then enters the recording spot M, and due to the lens effect of the recording spot M, it advances along a path diverging from the recording spot M. For this reason, almost no light is reflected at the far-side interface 18 of the recording spot M. Meanwhile, as seen in FIG. 7, at a non-recorded portion of the recording layer 14, which is a portion other than recording spots M, the reading beam OB is reflected at the far-side interface 18 and therefore a difference in the intensity of the reflected light is obtained between the recorded portion and the non-recorded portion. Therefore, the information is regenerated.

As described above, according to the optical information recording medium 10 in this embodiment, recording and reading of information is carried out by making use of a difference in the reflectivity between a recorded portion and a non-recorded portion of the far-side interface 18. However, according to the conventional recording method, the information is regenerated by making use of interference effect between the reflection at the far-side interface 18 and the reflection at the near-side interface 19, and therefore the reflection at the near-side interface 19 is indispensable. Contrary to the conventional recording method, the reflection at the near-side interface 19 is not necessary for the recording method described in this embodiment, but rather considered as noise. For this reason, as described in this embodiment, the refractive index of the recording layer 14 and the refractive index of the intermediate layer 15 are gradually changed at the near-side interface 19, so that the record/readout beam does not reflect at the near-side interface 19. This improves the signal-to-noise ratio of the readout beam.

Further, according to the optical information recording medium 10 as described above in this embodiment, since the modulation for the reproduction output (intensity of the reflected light) is obtained between the recorded portion and the non-recorded portion without using interference effect and by making use of the lens effect of the recording spot M formed in the recording layer 14, the optical information recording medium 10 can be manufactured without requiring highly-accurate film thickness of the recording layer 14 and thus with reduced manufacturing cost. Further, since the reflection of the reading beam at the far-side interface 18 is used upon reading out the information, a higher reproduction output is obtained as compared with a method utilizing fluorescence.

Next, description will be given of a manufacturing method for the optical information recording medium 10.

As seen in FIG. 8(a), a material for the intermediate layer 15 is applied by spin coating to a workpiece consisting of a substrate 11 and a servo signal layer 12 formed on top of the substrate 11, followed by irradiation with ultraviolet light to cure the intermediate layer 15. Accordingly, the surface of the cured intermediate layer 15 provides a recording layer forming surface 15A, on which a recording layer 14 is formed in a subsequent step.

As seen in FIG. 8(b), a material for the recording layer 14 is then applied to the recording layer forming surface 15A by spin coating (first step).

Next, as seen in FIG. 8(c), the material for the intermediate layer 15 is applied before curing the recording layer 14 or after partially curing the recording layer 14 by a slight amount of ultraviolet light radiation or other means (second step). In the second step, the material for the intermediate layer 15 in the form of liquid is adhered on the recording layer 14 which has not been completely cured, so that the material for the recording layer 14 and the material for the intermediate layer 15 are slightly dispersed and merged with each other.

Thereafter, the material for the intermediate layer 15 is cured by irradiation with ultraviolet light (third step). Once the intermediate layer 15 is cured, the recording layer 14 and the intermediate layer 15 are fixed to each other with these layers being appropriately merged. Namely, dispersion of the recording layer 14 and the intermediate layer 15 does not occur afterwards. Accordingly, a set of layers including the recording layer 14 and the intermediate layer 15 (composite layer) is formed.

After that, the first step to the third step as described above are repeated. To be more specific, as seen in FIG. 9(a), the recording layer 14 is applied on top of the uppermost intermediate layer 15 (recording layer forming surface 15A) (first step). At this time, since the uppermost intermediate layer 15 has been completely cured, even if the material for the recording layer 14 is applied thereon, the recording layer 14 is not merged with the intermediate layer 15.

Next, as seen in FIG. 9(b), the material for the intermediate layer 15 is applied to the recording layer 14 which has not been completely cured (second step), followed by irradiation with ultraviolet light to cure the material for the intermediate layer 15 (third step). Accordingly, a second composite layer is formed. After that, the aforementioned first to third steps are repeated plural times. Finally, a cover layer 16 is formed on top of the intermediate layer 15 to produce an optical information recording medium 10.

According to the manufacturing method for the optical information recording medium 10 as described in this embodiment, the optical information recording medium 10 is manufactured by repeating the application step and the curing step on a spin coater. In other words, it is possible to manufacture the optical information recording medium 10 at low cost using conventional spin coater equipment.

Although one exemplary embodiment of the present invention has been described above, the present invention is not limited to the above-described embodiment and various changes and modifications may be made where necessary.

Figure 10:
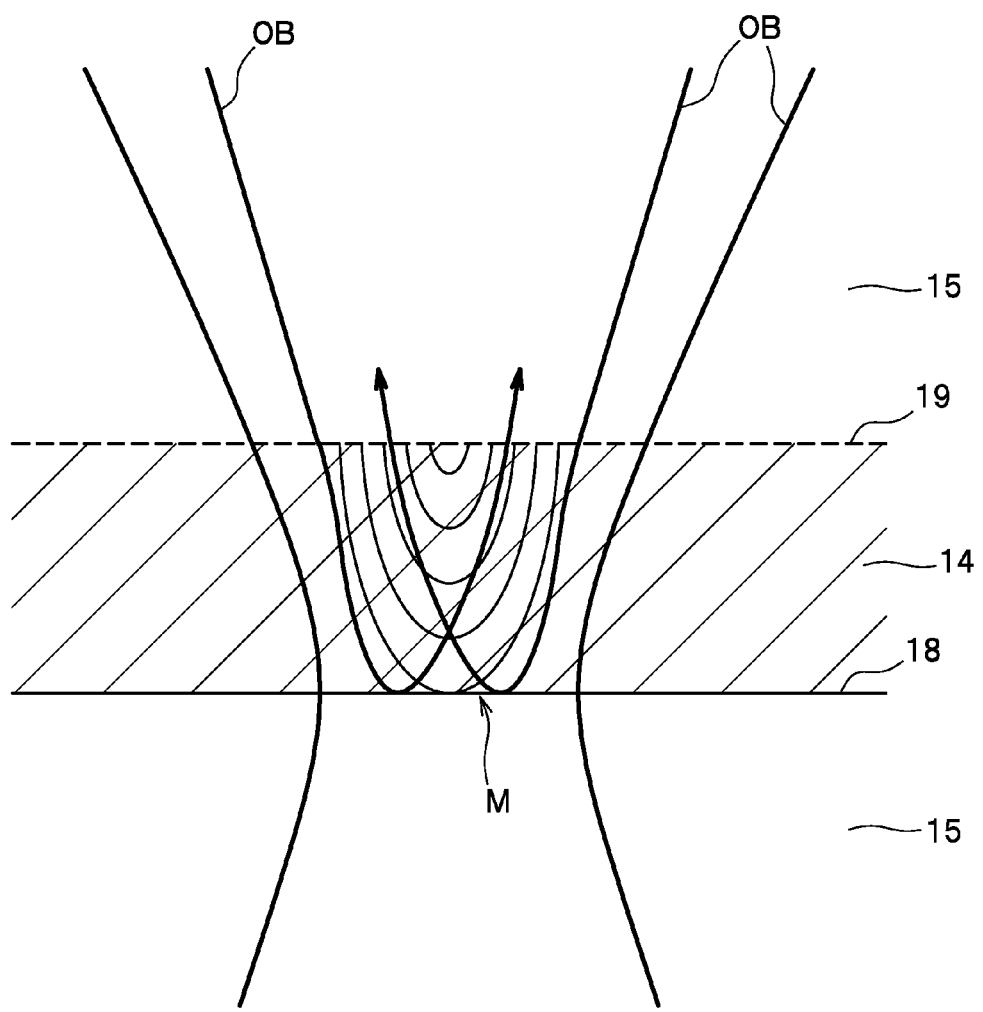
FIG. 10 is an explanatory view of a modified embodiment and showing the lens effect at the time of reading out information.

For example, in the above embodiment, the refractive index of the recording layer 14 decreases by irradiation with the recording beam. However, a recording material which increases the refractive index by irradiation with the recording beam may be used instead. In this instance, as seen in FIG. 10, since the recording spot M acts to collect the reading beam OB, the recorded portion reflects the reading beam OB with a reflectivity higher than that of the non-recorded portion, so that the modulation is generated by the difference in the intensity of the reflected light between the recorded portion and the non-recorded portion. Of course, to increase the degree of modulation to obtain a higher signal-to-noise ratio in the reproduction output, as with the above embodiment, it is preferable that the recording layer 14 contains a recording material which decreases the refractive index by irradiation with the recording beam.

In the above embodiment, the material for the recording layer 14 and the material for the intermediate layer 15 are applied using a spin coater. However, as long as a proper coating film having a desired thickness is obtained, the application method is not limited to the spin coating.

In the above embodiment, the material for the intermediate layer 15 contains UV curable resin (light curing resin). However, the material for the intermediate layer 15 is not limited to this specific embodiment and may not contain any light curing resin.

Further, in the above embodiment, the cover layer 16 is formed on top of the intermediate layer 15. However, the present invention is not limited to this specific embodiment, and the cover layer 16 may be formed on top of the recording layer 14.

What is claimed is:

1. An optical information recording medium comprising:
   a plurality of recording layers, each of which undergoes a change in a refractive index by irradiation with a recording beam; and at least one intermediate layer provided between the plurality of recording layers, wherein the recording layers and the intermediate layer have different refractive indices, and wherein among interfaces between the plurality of recording layers and the at least one intermediate layer, a recording layer and an intermediate layer disposed adjacent to the recording layer at an incident side from which the recording beam enters the recording layer are merged with each other at an interface therebetween, whereby a refractive index gradually changes at the interface, which satisfies $0.001 < ((n2-n1))/(n2+n1))^2 < 0.04$, where n1 is a refractive index of the recording layer, and n2 is a refractive index of the intermediate layer.

2. The optical information recording medium according to claim 1, wherein the recording layers are made of resin which contains dye, and the at least one intermediate layer is made of resin which is transparent to the recording beam.

3. A method for manufacturing an optical information recording medium of claim 1, comprising:
   a first step of applying a material for the recording layer to a recording layer forming surface;
   a second step of applying a material for the intermediate layer before curing the material for the recording layer or after partially curing the material for the recording layer; and
   a third step of curing the material for the recording layer and the material for the intermediate layer, whereby the intermediate layer is formed on the recording layer such that the recording layer and the intermediate layer are merged with each other at an interface therebetween and a refractive index gradually changes at the interface,
   wherein the first step to the third step are repeatedly carried out.

4. The method according to claim 3, wherein application of the material for the recording layer and application of the material for the intermediate layer are carried out by spin coating.

5. The method according to claim 3, wherein the material for the intermediate layer contains light curing resin, and wherein the material for the intermediate layer is cured in the third step by irradiation with light.

6. An optical information recording medium comprising:
   a plural of recording layers, each of which undergoes a change in a refractive index by irradiation with a recording beam; and
   a plurality of intermediate layers each provided between adjacent recording layers,
   wherein the recording layers and the intermediate layers have different refractive indices,
   wherein a recording layer has a first interface and a second interface at both sides thereof, the first interface being located at an incident side from which the recording beam enters the recording layer, and the second interface being located at a side opposite to the first interface,
   wherein the recording layer and an intermediate layer are merged with each other at the first interface, whereby a refractive index gradually changes at the first interface, and
   wherein the recording layer and the intermediate layer form a clear interface at the second interface, whereby a refractive index abruptly changes at the second interface, wherein each recording layer has a thickness equal to or greater than $2\lambda/n$, where $\lambda$ is a wavelength of the recording beam, and n is the refractive index of each recording layer.

7. The optical information recording medium according to claim 6, wherein the thickness of each recording layer is equal to or smaller than 5 μm.

8. The optical information recording medium according to claim 6, wherein the recording layers are made of resin which contains dye, and the intermediate layer is made of resin which is transparent to the recording beam.

9. An optical information recording medium comprising:
   a plurality of recording layers, each of which undergoes a change in refractive index by irradiation with a recording beam; and
   a plurality of intermediate layers each provide between adjacent recording layers,
   wherein the recording layers and the intermediate layers have different refractive indices,
   wherein a recording layer has a first interface and a second interface at both sides thereof, the first interface, being located at an incident side from which the recording beam enters the recording layer, and the second interface being located at a side opposite to the first interface,
   wherein the recording layer and an intermediate layer are merged with each other at the first interface, whereby a refractive index gradually changes at the first interface, and
   wherein the recording layer and the intermediate layer form a clear interface at the second interface, whereby a refractive index abruptly changes at the second interface, which satisfies $0.001 < ((n2-n1)/(n2+n1))^2 < 0.04$, where n1 is a refractive index of the recording layer, and n2 is a refractive index of the intermediate layer.

* * * * *